Figure 1:
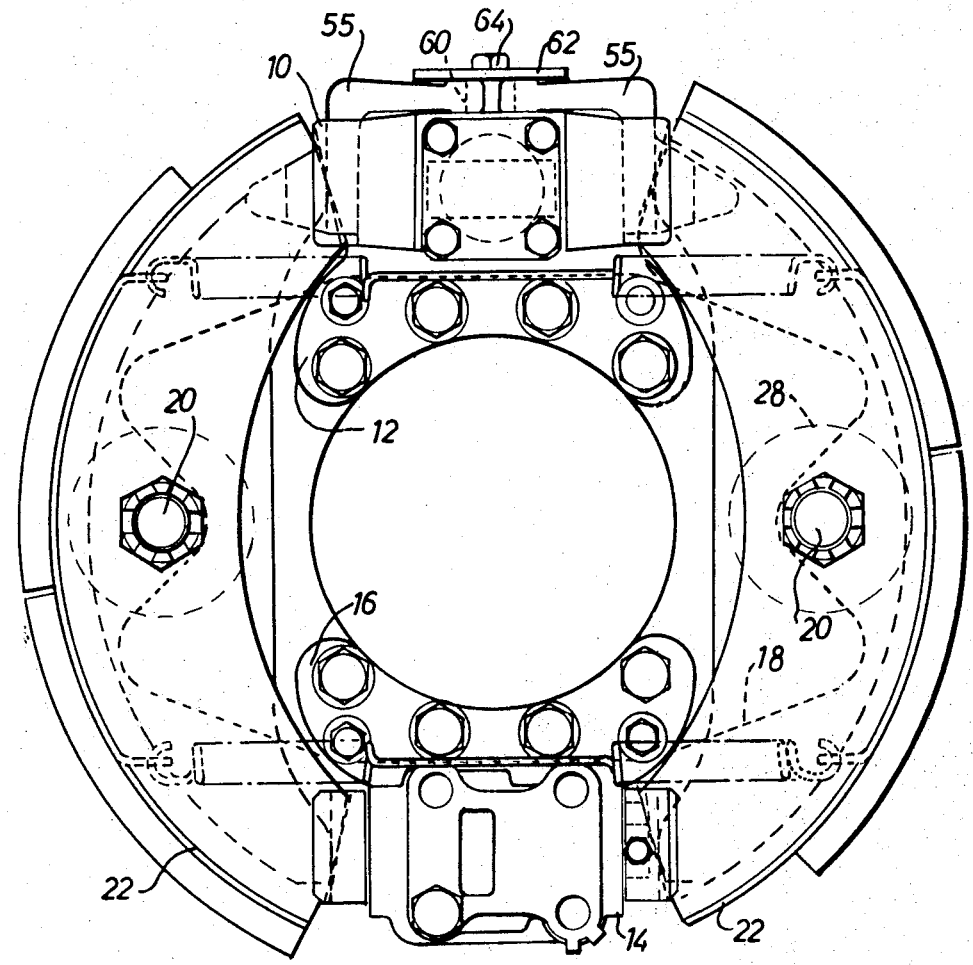

United States Patent

[11] 3,536,168

| [72] | Inventor | Charles Newstead<br>Walsall, England |
|---|---|---|
| [21] | Appl. No. | 713,335 |
| [22] | Filed | March 15, 1868 |
| [45] | Patented | Oct. 27, 1970 |
| [73] | Assignee | Girling Limited<br>Birmingham, England<br>a British Company |
| [32] | Priority | Mar. 16, 1967 |
| [33] | | Great Britain |
| [31] | | 12,357/67 |

[54] VEHICLE DRUM BRAKES
8 Claims, 9 Drawing Figs.

[52] U.S. Cl. .................................................. 188/79,
188/217
[51] Int. Cl. .................................................. F16d 51/30,
F16d 65/46
[50] Field of Search .......................................... 188/79,
79,550, 196(M), 178.9, 204, 217

[56] References Cited
UNITED STATES PATENTS

| 2,042,445 | 5/1936 | Eksergian | 188/79 |
| 2,366,946 | 1/1945 | Whitacre | 188/79X |
| 2,645,311 | 7/1953 | Farkas | 188/79 |
| 2,692,028 | 10/1954 | Buckendale | 188/79X |
| 2,976,958 | 3/1961 | Scholl | 188/78.9X |

FOREIGN PATENTS

| 788,586 | 1/1958 | Great Britain | 188/79 |

Primary Examiner—Duane A. Reger
Attorney—Scrivener, Parker, Scrivener and Clarke ABSTRACT: The invention relates to vehicle shoe drum brakes of the type in which two or more brake shoes are arranged in side-by-side relation at each shoe position and in such a brake, the invention provides a brake actuator in which braking thrust applied to a thrust member is transmitted to the brake shoes by a balance beam which permits differential movement between the shoes. The brake also includes an adjuster mechanism in which tappets cooperating one with each shoe are connected to one another and to a common adjustment input point by a gear train which produces simultaneous and uniform adjustment of the tappets and thus of the brake shoes themselves.

3,536,168

VEHICLE DRUM BRAKES

This invention concerns vehicle drum brakes.

For heavy duty applications, for example in larger goods and passenger vehicles, use is often made of drum brakes employing wide brake shoes, usually of twin-webbed construction. However, if the drum should distort into conical shape, as can often happen due to the heat generated during a braking operation, then the shoes become tilted as they are applied to the drum, resulting in separation of one of the webs of each shoe from its drag-taking abutment with consequential uneven wear and uneven loading of the abutment.

The invention seeks to provide a drum brake construction which will avoid this disadvantage.

According to the present invention, a drum brake assembly includes sets of individual brake shoes arranged in side-by-side relation, actuator means located between one group of adjacent shoe ends and including a balance beam member and a thrust member acting on said balance beam member for transmitting brake actuating thrust to said shoes, said balance beam member being angularly displaceable relative to said thrust member for permitting differential shoe movement while transmitting equal actuating thrusts to said shoes, and brake adjustment means located between the opposite group of shoe ends and including an adjustable abutment for each shoe end and means interconnecting the abutments for simultaneously and uniformly displacing all said abutments from a common adjustment control point.

By virtue of the reduced width of the individual shoes used in the invention, the tilting effect experienced with the wider shoes of the prior art is avoided, equal braking effort is more readily applied to each shoe and wear is distributed more satisfactorily evenly between the shoes.

Preferably the brake adjustment means comprises a plurality of separate adjuster units together with a mechanical interconnection such as a mechanical lever and/or bell crank and/or cam linkage or a gear train connecting said units to a common input point.

The invention may be applied either to drum brakes in which the shoes are arranged to be leading shoes in both directions of rotation of the brake drum or to brakes which use leading shoe/trailing shoe arrangements. Where the shoes are leading shoes in both directions of rotation, the brake actuating means preferably includes a carrier member for each shoe and a pin supported from a fixed part of a vehicle, as from the vehicle axle housing flange, and in turn providing a mounting for the carrier members, the balance beam member being a swing beam which acts on the carrier members thereby through the pin to impart common translational movement to the shoes while enabling them to turn on the pin according to the direction of drum rotation. In the case of a leading shoe/trailing shoe drum brake, the balance beam is conveniently arranged to act directly on the shoe ends.

Figure 2:
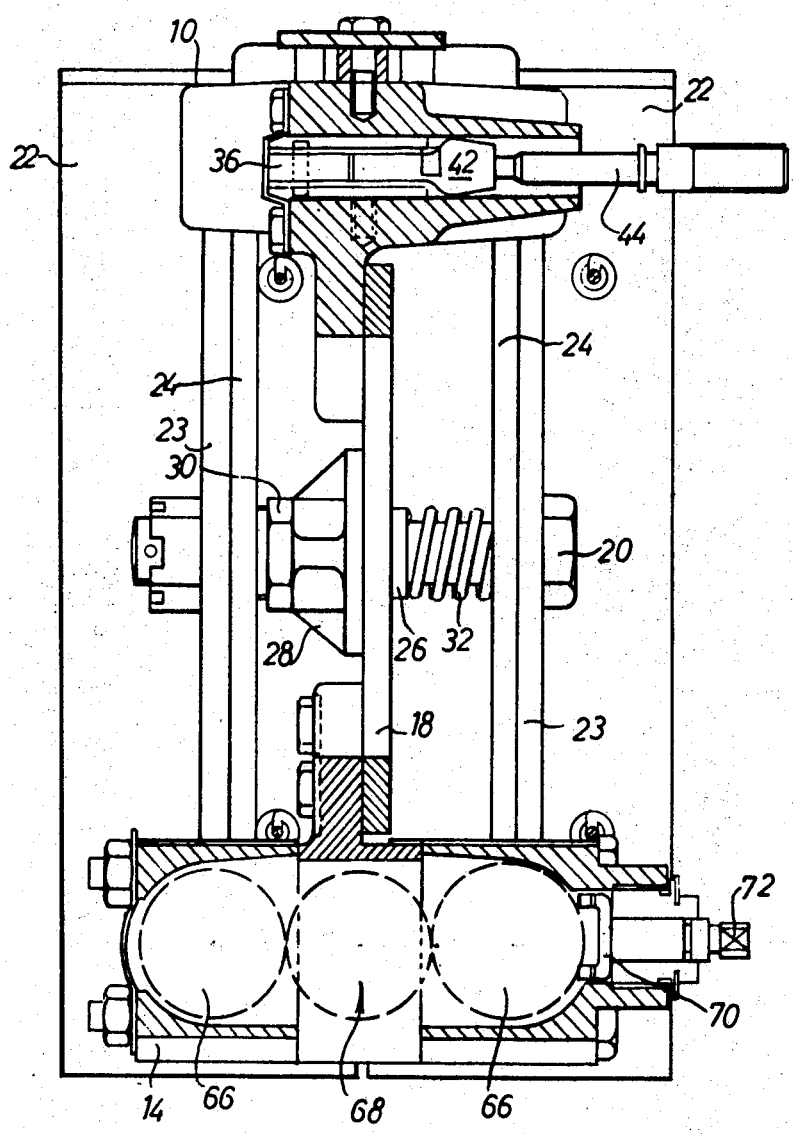
Figure 3:
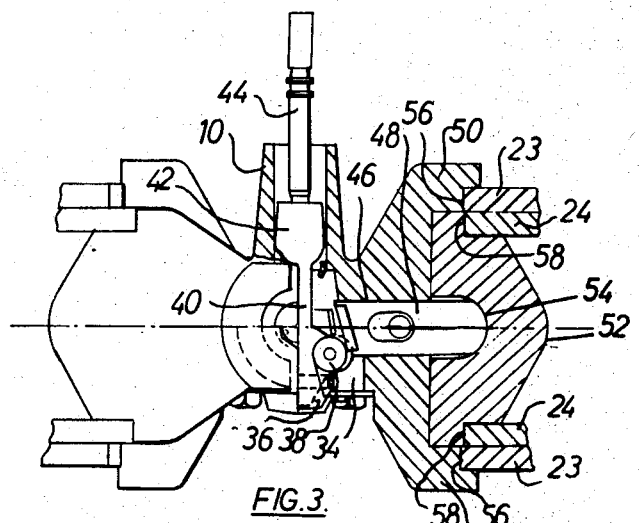
Figure 4:
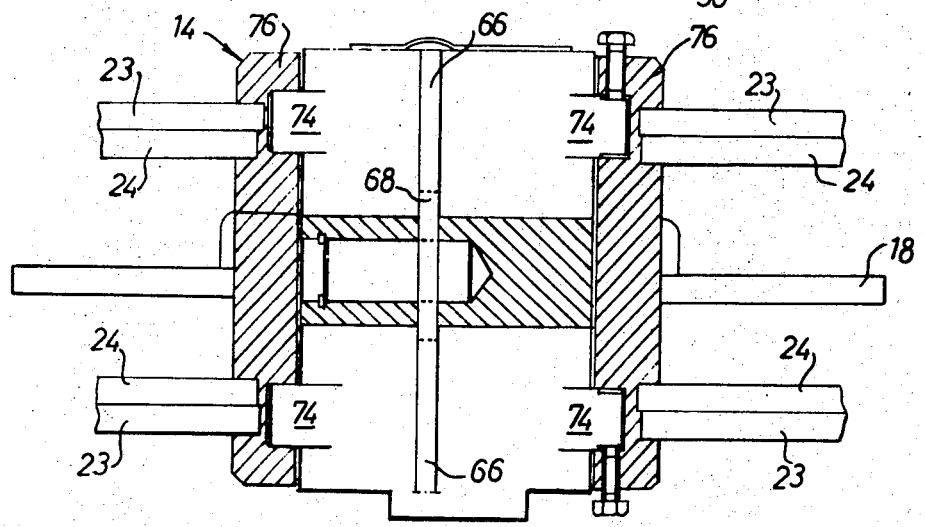
Figure 5:
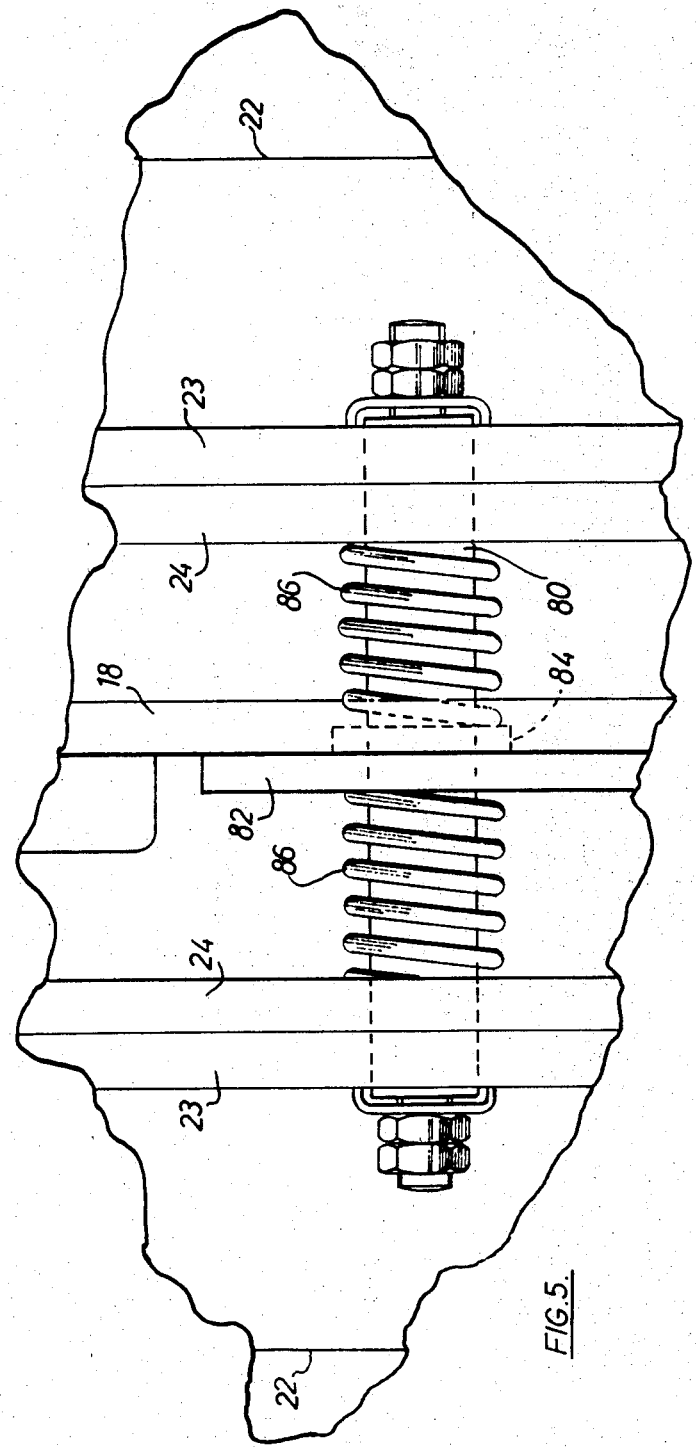
Figure 6:
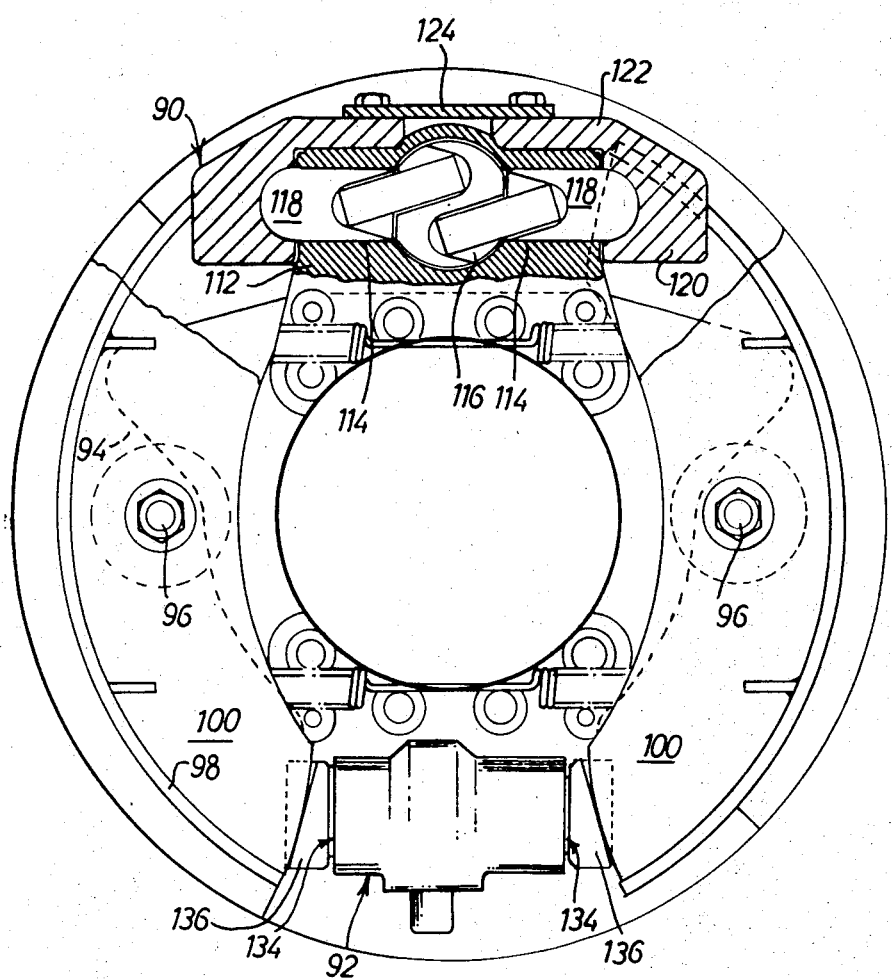
Figure 7:
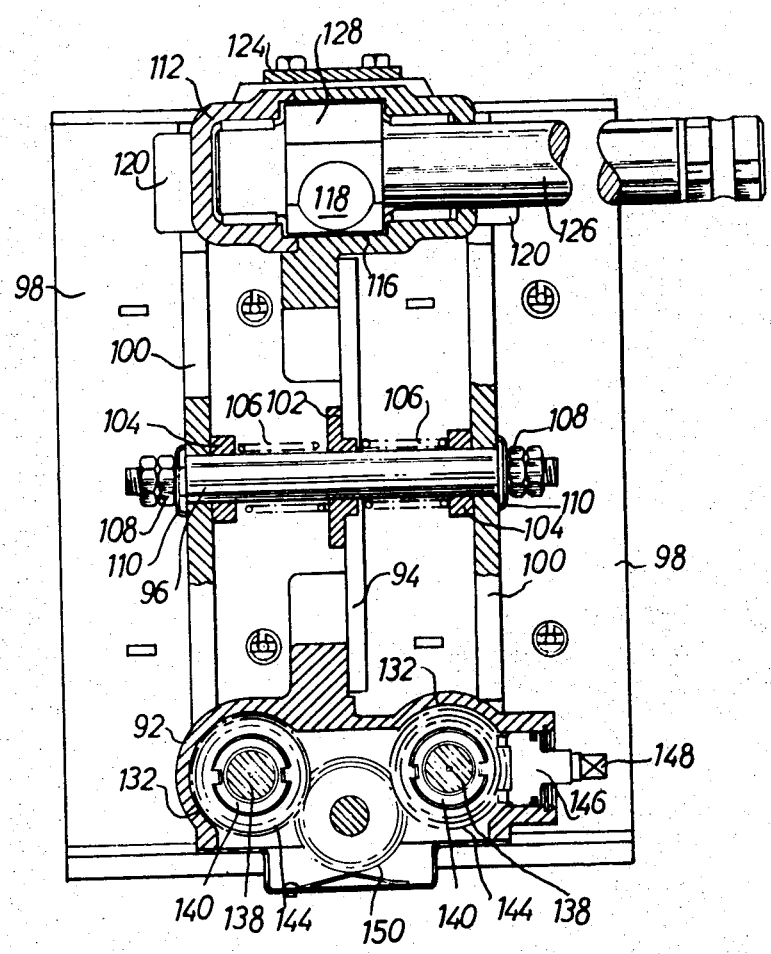
Figure 8:
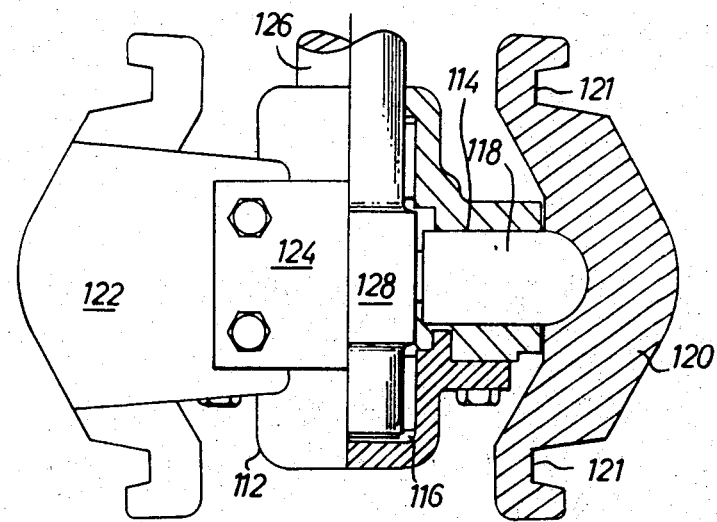
Figure 9:
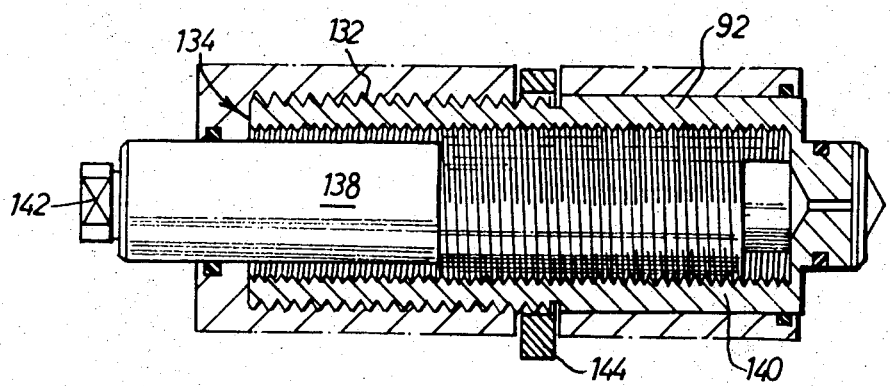

The invention will be described further, by way of example, with reference to the accompanying drawings, in which:

FIG. 1 is an elevation, with parts omitted for clarity, of one embodiment of drum brake assembly according to the invention, FIG. 2 is an axial section taken on the line II–II of FIG. 1, FIG. 3 is a sectional detail of the brake expander mechanism, FIG. 4 is a sectional detail of the brake adjuster mechanism, FIG. 5 is a sectional detail of an alternative carrier member and brake shoe mounting pin, FIG. 6 is an elevation similar to that of FIG. 1 of another drum brake assembly embodying the invention, FIG. 7 is an axial section taken on the line VII–VII of FIG. 6, FIG. 8 is a sectional detail of the brake expander mechanism used in the brake assembly of FIGS. 6 and 7, and FIG. 9 is a longitudinal section through a part of one construction of adjustable abutment unit suitable for use in the illustrated brakes.

In the drum brake shown in FIGS. 1 to 4, the body member 10 of a brake expander mechanism is bolted by means of a lug 12 on to an assembly plate 18 which in turn is bolted to the flange of a vehicle axle housing (not shown). The body member 14 of a brake adjuster mechanism is similarly bolted by means of a lug 16 to the plate 18 and hence to the same flange. The assembly plate 18 is mounted between the two mechanisms and acts as a guide and locating plate for pins 20 in turn constituting a mounting and a guide for brake shoes 22 and carrier members 24. Each pin 20 acts to connect a carrier member 24 to its associated brake shoe 22, and as will be seen more particularly from FIG. 2, the arrangement is such that each pin 20 passes through a tube 26 biased by the usual shoe return springs to seat in a recess in the side of the seat assembly plate 18, the tubes 26 being externally threaded and engaged by a large flanged guide nut 28 and a lock nut 30. A compression spring 32 is located around each pin 20, between one end of the tube 26 and the carrier member 24 on the same side of the assembly plate 18, the opposite end of the tube 26 engaging the other carrier member 24. The guide nut 28 abuts the assembly plate 18 and enables the position of the tube 26 relative to the plate 18 to be adjusted to ensure correct axial positioning of the shoes (along the rotational axis of the brake drum) relative to the expander and adjuster mechanisms. It further ensures that the respective shoe webs 23 lie normal to the axis of the drum, i.e. that the shoes are square with the drum.

Any type of expander mechanism may be used in the invention and FIG. 3 illustrates by way of example the provision of a rocking wedge type expander employing caged rollers. As shown in FIG. 3, the expander body member 10 is formed with a central chamber 34 containing a wedge member 36, the inclined faces of which are engaged by rollers 38. The wedge member 36 has a stem 40 extending in a direction transversely outwardly of the body member 10 and terminating in an internally threaded and externally part-spherical end 42 providing a connection for a pull rod 44 by which the wedge member may be displaced in the chamber 34. Along its longitudinal bisector, the body member 10 is formed on each side of the chamber 34 with a bore 46 housing a tappet 48 having its inner end inclined complementarily to the facing inclined surface of the wedge member 36 and bearing on a diametrically opposed portion of the roller 38. Each end of the body member 10 is symmetrical about the bore 46 and is of modified C-shape, presenting laterally directed lugs 50 between which is arranged a swing beam 52 provided with a central spherical seating 54 for receiving the outer and correspondingly shaped end of the tappet 48.

The lugs 50 of the expander body member 10 are stepped to define abutments 56 for webs 23 of the brake shoes 22 and similar steps are formed in the swing beam 52 to accommodate the carrier members 24. Each swing beam has an arm 55 which extends over the top of the expander body member 10 and terminates in an open collar or bifurcation embracing a bush 60 retained on the body member 10 beneath a washer 62 by a screw 64. Due to the wear of the friction linings and consequent displacement of the carrier with respect to the swing beam 52, upon adjustment, the engagement between the beam and the carrier becomes offset from the engagement between the tappet and the beam, which results in a turning couple on the beam. It is a function of the arms 55 to resist this couple while still having the facility to slide between the washer 62 and the housing.

One typical adjuster means for use with the invention is illustrated in FIGS. 2 and 4 and comprises within the adjuster body member 14, a gear train including outer gear wheels 66 and an intermediate gear wheel 68 which mesh together, with one of the outer gears 66 being engaged by a crown wheel 70 rotatable through a manual spindle 72. Tappets 74 displaceable within the adjuster body member 14 constitute adjustable abutments which are arranged in pairs to act on beams 76 engaging the respective pairs of shoe webs 23 and carrier members 24. The outer gear wheels 66 are formed with threaded bosses or equivalent members engaging correspondingly threaded bores in the tappets and the latter are restrained from rotation so that rotation of spindle 72 to rotate the gear wheels results in axial displacement of the tappets 74.

In the operation of the brake proposed by the invention, a pull exerted on the pull rod 44 to move the wedge member 36 outwardly of the expander body member 10 displaces the brake shoes 22 towards the drum. On engagement of the shoe linings with the drum, the shoes 22 move around with the drum very slightly until their leading ends respectively engage the abutments on the beam 76 of the adjuster member or the abutments 56 of the expander body member 10, dependent upon the direction of rotation. Continued expansion of the carrier members 24 applies full load to the brake shoes which are capable of turning on the pins 20 and are thus "leading shoes" whatever the direction of drum rotation although it will be appreciated that the shoes engage different abutments in opposite directions of rotation.

Since the drum when hot expands to a frustoconical shape, the brake shoes 22 at the open side of the drum have to move further outwardly in order to achieve full load. During this movement, the swing beam 52 tilts on the spherical end of the tappet 48 to accommodate consequential differential movement between the brake shoes and/or carrier members at its opposite ends.

In the modification of the invention shown in FIG. 5 a pin 80 (instead of a tube corresponding to the tube 26) is guided and located by the plate 18 and the guide and lock nuts 28, 30 are replaced by a guide flange 82 which is welded directly to the pin 80, a spacer plate 84 is also welded to the pin 80 abutting the guide flange 82 to ensure that compression springs 86 arranged one each side of the assembly plate 18 are of equal length and thus ensure correct positioning of the brake shoes 22 and carrier members 24.

The invention thus provides a drum brake in which the facility for differential movement between the twin brake shoes eliminates the problem of tilting experienced with wider brake shoes and achieves a better distribution of load and wear. As will be appreciated only two carrier members 24 are required for each pair of brake shoes 22, the pin 20 or 80 between the carrier members and the brake shoes is subjected to balanced bending moments, while the assembly plate 18 is subjected neither to torque nor to twisting moment. As mentioned earlier, any expander mechanism can be used for operating the brake, while for different sizes of brake it is necessary only to adapt the dimensions of the swing beam 52 and the spacing between the abutments 56 together with the corresponding dimensions and spacing of the beams 76 and the abutments thereon.

While the brakes described immediately above employ shoes which are leading shoes in both directions of rotation, the brake illustrated in FIGS. 6 to 8 inclusive uses twin shoes in a leading shoe/trailing shoe arrangement. As shown in FIG. 6, a brake expander mechanism 90 and a brake adjuster 92 are bolted on to an assembly plate 94 which is secured to a flange of the vehicle axle housing (not shown). A pin 96 passes through the webs 100 of twin brake shoes 98 arranged in side-by-side relation and a flanged bush 102 is welded to the pin centrally intermediate the ends thereof. The bush 102 abuts and is guided by the assembly plate 94. Towards each end of the pin 96 is carried a spacing bush 104 which abuts the adjacent shoe web 100 and a compression spring 106 is arranged to act between each spacing bush 104 and the central flanged bush 102. The pin is threaded at each end and carries nuts 108 which, through dished washers 110, bear against the shoe webs to retain the shoes mounted on the pin and to enable the axial position of the shoes along the pin to be adjusted.

As best seen from FIGS. 6 and 8, the brake expander mechanism 90 comprises a body member 112 formed with a pair of opposed cylinders 114 opening into a central chamber 116 extending transversely of the cylinders 114. Each cylinder 114 contains a tappet 118 having its free outer end projecting from the body member 112 to engage a central recess of a swinging beam member 120 which extends in a direction generally parallel to the chamber 116. Swing beam 120 is guided on the body member 112 by means of an arm 122 extending over the body member and retained freely thereon by a cover plate 124. Within the chamber 116 there is arranged a shaft 126 formed with a cam 128 and between the cam 128 and each tappet 114 there is positioned a dolly member 130. Thus, brake actuation is accomplished by turning the shaft 126 in any convenient manner to displace the dolly members 130 by virtue of the cam action and thereby to move the tappets 118 outwardly in their cylinders. In this connection, it will be noted that each free end of the swing beam 120 is stepped and recessed to form an abutment 121 wherein is received the web 100 of a brake shoe 98 and that the expander mechanism thus acts directly on the brake shoes rather than through the intermediary of pin-mounted carrier members as in the embodiments of FIGS. 1 to 5 of the drawings.

The adjuster mechanism shown in FIGS. 6 and 7 is intended, as in the embodiments previously described, to enable simultaneous and uniform adjustment displacements to be imparted to all the individual brake shoes from a common adjustment point. For this purpose, the adjuster body member 92 is formed with a pair of circumferentially directed and axially spaced cylinders 132 each containing a pair of opposed tappets 134 with the tappets 134 at the same circumferential end of the body member 92 acting on a beam 136 constituting an abutment for the adjacent brake shoe ends. Conveniently, the tappets 134 are two-part members having the parts thereof threaded and engaged one within the other, whereby relative rotation between the two tappet parts will cause the tappets to expand. A preferred construction of this nature is shown in FIG. 9, wherein the tappet 134 is illustrated as comprising a shaft 138 having threaded engagement in a sleeve 140 which in turn is threadedly engaged in the body member cylinder 132. The sleeve and the shaft project from the body member 92 for engagement with the beams 136. The sleeve is rotatable relative to the body member but the shaft is prevented from rotating by a square section spigot 142 engaged in a square hole in the adjacent beam 136, the latter being held from rotation by its engagement with the shoe web 100. The screw threads between the body member 92 and the sleeve 140 and between the sleeve and the shaft 138 are of the same hand but the pitch of the latter is greater than that of the former by an amount such that rotation of the sleeve relative to the body member produces opposite axial displacements of equal velocity.

The sleeve is rotated by means of a ring gear 144 which is located in a recess in the body member and is slidably keyed to the sleeve. Meshing with the ring gear 144 is a face gear 146 (FIG. 7) which is rotatable by means of a spigot having a squared end 148. The spigot 148 projects in an axial direction of the brake so as to be readily accessible for adjustment.

The adjuster unit described with reference to FIG. 9 is shown arranged at the right-hand side of the body member 92 in FIG. 7. A similar unit is arranged at the left-hand side of the body member, but with the difference that, in place of the face gear 146, an intermediate ring gear 150 is positioned between the two ring gears 144. Adjustment from the spigot 148 is thus transmitted to both adjuster units to effect simultaneous and uniform adjustment of all the tappets and thus of the beams 136. A clock spring 152 engages between the teeth of the ring gear 150 to render adjustments audible and to prevent vibration causing unwanted adjustment.

I claim:

1. A drum brake assembly comprising a plurality of sets of individual brake shoes arranged in side-by-side relation, actuator means located between one group of adjacent shoe ends and including a balance beam member and a thrust member acting on said balance beam member for transmitting brake actuating thrust to said shoes, said balance beam member being angularly/movable relative to said thrust member for permitting differential shoe movement while transmitting actuating thrust to said shoes, and brake adjustment means located between the opposite group of shoe ends and including an adjustable abutment for each shoe end, a single adjustment control point for said abutments, a plurality of separate adjuster units operatively connected to said abutments and each comprising a two-part tappet having the parts thereof threaded and engaged one within the other, whereby relative rotation between the two tappet parts will cause said tappets to expand, gear means on one of said parts and further gear means connecting said units in driving relation with one another and connecting one of said units to said common control point.

2. A drum brake assembly as set forth in claim 1, further comprising a beam at each end of the brake adjustment means and wherein the tappet ends projecting from the same end of the adjuster means act against said beam which in turn spans and acts against the ends of the adjacent brake shoes.

3. A drum brake assembly as set forth in claim 1, further comprising an assembly plate adapted for securing to a fixed part of a vehicle, said actuator means and said brake adjustment means being mounted at diametrically opposed positions on said assembly plate, an axially directed pin traversing the periphery of said assembly plate and carrying said sets of brake shoes, central guide flange means carried on said pin and adapted to rest in surface guiding contact with said assembly plate, threaded end regions on said pin and adjustable retaining nuts on said threaded end regions.

4. A drum brake assembly as set forth in claim 3, further comprising a carrier plate, said pin passing through said carrier plate and through a web of each brake shoe, said carrier plate abutting said web and being interposed between said web and said assembly plate with said balance beam engaging said carrier plates to transmit brake actuating thrust to said pin, an externally threaded tube carried by said pin, a guide nut constituting said guide flange means and seated on said tube, said tube extending from a position abutting one of the carrier plates to terminate at the side of the assembly plate remote therefrom, and a compression spring arranged on said pin between said tube and the other carrier plate.

5. A drum brake assembly as set forth in claim 3, further comprising a carrier plate, said pin passing through said carrier plate and through a web on each brake shoe, said carrier plate abutting said web and being interposed between said web and said assembly plate with said balance beam engaging said carrier plates, a spacer plate and a contiguous annular flange together constituting said guide flange means, said annular flange extending radially beyond said spacer plate, said flange and said spacer plate both being fixed to said pin, and a compression spring arranged between each carrier plate and said guide flange means.

6. A drum brake assembly as set forth in claim 3, further comprising a flanged bush constituting said guide flange means, said pin passing through a web of each brake shoe and said flanged bush being fixed to the pin centrally intermediate the ends thereof; a spacer bush mounted on said pin adjacent each shoe web, and a compression spring arranged between each spacer bush and the central flanged bush, said balance beam being arranged to act directly on the ends of the brake shoes.

7. A drum brake assembly as set forth in claim 1, further comprising a body member for said actuator means, said balance beam member extending transversely across the end of said body member and being formed intermediate its own ends with a part-spherical recess, a tappet member projecting from said body member and constituting said thrust member, said tappet member having a part spherical free end engaging in the recess of the balance beam member, and an arm on said balance beam member which extends over and is freely located and guided on said body member.

8. A drum brake assembly as set forth in claim 7 wherein said body member has generally C-shaped ends each presenting a laterally directed lug, said balance beam being located between said lugs and said lugs constituting abutments for the adjacent brake shoe ends.